United States Patent
Yi et al.

(10) Patent No.: US 8,551,232 B2
(45) Date of Patent: Oct. 8, 2013

(54) DRY CARBON DIOXIDE CAPTURE APPARATUS

(75) Inventors: Chang-Keun Yi, Daejeon (KR); Gyong-Tae Jin, Daejeon (KR); Do-Won Sun, Daejeon (KR); Sung-Ho Jo, Daejeon (KR); Jae-Hyeon Park, Daejeon (KR); Dal-Hee Bae, Daejeon (KR); Ho-Jung Ryu, Daejeon (KR); Young-Cheol Park, Daejeon (KR); Seung-Yong Lee, Daejeon (KR); Jong-Ho Moon, Seoul (KR)

(73) Assignee: Korea Institute of Energy Research, Daejeon (KR)

( * ) Notice: Subject to any disclaimer, the term of this patent is extended or adjusted under 35 U.S.C. 154(b) by 178 days.

(21) Appl. No.: 13/283,944

(22) Filed: Oct. 28, 2011

(65) Prior Publication Data

US 2012/0132078 A1 May 31, 2012

(30) Foreign Application Priority Data

Nov. 30, 2010 (KR) .................. 10-2010-0120741

(51) Int. Cl.
*B01D 53/02* (2006.01)

(52) U.S. Cl.
USPC .............. 96/146; 96/122; 96/123; 96/150; 95/107; 95/108; 95/109; 95/110; 95/111; 95/139

(58) Field of Classification Search
USPC .............. 95/107–112, 139; 96/122, 123, 96/146, 150; 423/230–233
See application file for complete search history.

(56) References Cited

U.S. PATENT DOCUMENTS

| 4,224,041 | A | * | 9/1980 | Noack et al. ............. 96/146 |
| 4,409,102 | A | * | 10/1983 | Tanner ............. 210/603 |
| 4,539,188 | A | * | 9/1985 | Hirsch et al. ............. 423/210 |
| 5,304,234 | A | * | 4/1994 | Takatsuka et al. ............. 95/106 |
| 6,030,591 | A | * | 2/2000 | Tom et al. ............. 423/240 S |
| 6,387,337 | B1 | * | 5/2002 | Pennline et al. ............. 423/220 |
| 2002/0023538 | A1 | * | 2/2002 | Agarwal et al. ............. 95/108 |
| 2010/0172810 | A1 | | 7/2010 | Yi et al. |

FOREIGN PATENT DOCUMENTS

| JP | 2010517770 A | 5/2010 |
| KR | 1020050003767 | 1/2005 |

OTHER PUBLICATIONS

Kim, K., et al., "The effect of $CO_2$ or stream partial pressure in the regeneration of solid sorbents on the $CO_2$ capture efficiency in the two-interconnected bubbling fluidized-beds system," *Korean J. Chem. Eng.* 28(10):1986-1989, Korean Society of Industrial Engineering Chemistry, Korea (2011).
English Language abstract of Korean Publication No. KR1020050003767, Bae, D., et al., Korean Intellectual Property Office, Korea (2005), 1 page.

* cited by examiner

*Primary Examiner* — Christopher P Jones
(74) *Attorney, Agent, or Firm* — Sterne, Kessler, Goldstein & Fox P.L.L.C.

(57) ABSTRACT

Disclosed is a dry carbon dioxide capture apparatus with improved carbon dioxide capture efficiency through preventing gas backflows into vertical transport lines. The dry CO2 capture apparatus includes a capture reactor having a capture buffer chamber on the bottom side, a capture diffusion plate on top of the capture buffer chamber, and adsorbent particles in a space above the capture diffusion plate; a first separator connected to the capture reactor through a vertical transport line; a regenerator having a regeneration buffer chamber on the bottom side, a regenerating diffusion plate on top of the regeneration buffer chamber, and adsorbent particles in a space above the regenerating diffusion plate; a second separator connected to the regenerator through a gas separation line; and a second particle transfer line connected to the regenerator at one end and connected to the capture reactor at the other end.

5 Claims, 2 Drawing Sheets

DRY CARBON DIOXIDE CAPTURE APPARATUS

CROSS REFERENCE TO RELATED APPLICATIONS

This application claims priority from Korean Patent Application No. 10-2010-0120741, filed on Nov. 30, 2010 in the Korean Intellectual Property Office, the entire disclosure of which is incorporated herein by reference.

BACKGROUND OF THE INVENTION

1. Field of the Invention

The present invention relates to a dry carbon dioxide capture apparatus and, more particularly, to a dry carbon dioxide capture apparatus enabling improvement in carbon dioxide capture efficiency by preventing a gas backflow into a vertical transport line.

2. Background Art

A carbon dioxide capture apparatus in related art generally employs a wet process to recover $CO_2$. Treat is, the wet process is carried out by passing $CO_2$-containing gas through an amine solution, to allow $CO_2$ to be absorbed into the solution and regenerating the solution in a regeneration column, thus reusing the solution. However, the wet process has a demerit of further creating waste water during operation of the wet process.

In order to overcome disadvantages of the wet process in the related art, a dry process for $CO_2$ recovery has been proposed. This method is to recover $CO_2$ by a dry processing system using two reactors, wherein $CO_2$ fed into a recovery reactor is adsorbed to a solid adsorbent (a dry adsorbent) and removed. The solid adsorbent inflows into a regeneration reactor ('regenerator') to remove the adsorbed $CO_2$ and then the adsorbent is recycled in a recovery reactor.

Referring to FIG. 2, one embodiment of a dry $CO_2$ capture apparatus 1 for dry processing is described. The dry $CO_2$ capture apparatus 1 includes: a recovery reactor 2; a first cyclone 3 that separates solid adsorbents from the gas and the solid adsorbents flow after passing the recovery reactor 2; a regenerator 4 that separates $CO_2$ from the solid adsorbent (fed from the first cyclone) and then recycles the treated solid adsorbent in the recovery reactor 2; and a second cyclone 5 that is connected to the regenerator 4 and discharges $CO_2$ generated in the regenerator 4.

In the foregoing dry $CO_2$ capture apparatus 1, when a mixed gas containing $CO_2$ is fed into the lower part of the recovery reactor 2, the mixed gas contacts the solid adsorbent flowing in the recovery reactor 2, to thereby enable adsorption and separation of $CO_2$.

However, according to the dry $CO_2$ capture apparatus 1 in the related art, the gas in the regenerator 4 partially flows backward and is blended in the regenerator 4. For this reason, $CO_2$ capture and removal efficiency is decreased to be less than an expected level.

Since $CO_2$ and $H_2O$ contained in the mixed gas are introduced into the recovery reactor 2 in a high speed transport pipe form and immediately undergo adsorption and separation therein, concentrations of such $CO_2$ and $H_2O$ are reduced while these materials flow toward the upper part of the recovery reactor 2. Accordingly, due to differences in $CO_2$ and $H_2O$ concentrations in the recovery reactor, the $CO_2$ separation efficiency is limited.

BRIEF SUMMARY OF THE INVENTION

Therefore, the present invention has been proposed to solve the above problems in the related art and is directed to provision of a dry $CO_2$ capture apparatus having a bubble flow capture device and capable of preventing a gas backflow toward a vertical transport line, to thereby improve $CO_2$ capture efficiency.

In order to accomplish the above purpose, there is provided a dry carbon dioxide ($CO_2$) capture apparatus, which includes: a capture reactor wherein a capture buffer chamber connected with a gas inflow line is provided on the bottom side of the capture reactor, a capture diffusion plate is provided on a top side of the capture buffer chamber, and adsorbent particles are charged in a part of a space which is formed above the capture diffusion plate; a first separator connected to the capture reactor through a vertical transport line, in order to separate the adsorbent particles fed from the capture reactor into a solid part and a gas residue remaining after removing $CO_2$ from the adsorbent particles, then, discharge the gas residue; a regenerator wherein a regeneration buffer chamber connected to a regenerated heat source input line is provided on the bottom side of the regenerator, and a regenerating diffusion plate is provided on the top side of the regeneration buffer chamber, and adsorbent particles are charged in a part of a space which is formed above the regenerating diffusion plate, and wherein the regenerator is connected to the first separator through a first particle transfer line and receives solid adsorbent particles therefrom; a second separator connected to the regenerator through a gas separation line, in order to separate $CO_2$ only from the adsorbent particles in a powder state fed from the regenerator, then, discharge the separated $CO_2$; and a second particle transfer line connected to the regenerator at one end and connected to the capture reactor at the other end.

Preferably, the apparatus further comprises a cooling jacket for circulation of a coolant provided around the capture reactor, wherein the coolant absorbs reaction heat generated in the capture reactor.

Preferably, the bottom end of the vertical transport line is located inside the capture reactor.

Preferably, the bottom end of the vertical transport line is located lower than a height of the adsorbent particles charged in the capture reactor.

Preferably, at least one through-hole, through which the adsorbent particles pass, is formed on the bottom end portion of the vertical transport line.

Preferably, the bottom end of the second particle transfer line is located lower than a height of the adsorbent particles charged in the capture reactor, while the top end of the second particle transfer line communicates with an upper space of the regenerating diffusion plate of the regenerator.

Preferably, the second particle transfer line is provided with a control valve to control an amount of the adsorbent particles moving toward the capture reactor.

According to the present invention, there is provided a dry $CO_2$ capture apparatus, including: a bubble flow capture device adopted as an adsorption reactor of the dry $CO_2$ capture apparatus for treating exhaust gas in a large quantity, rather than the existing high speed fluidization column; and a vertical riser provided in an adsorption column to prevent a gas backflow, thus enhancing $CO_2$ capture removal efficiency.

BRIEF DESCRIPTION OF THE FIGURES

The above and other objects, features and other advantages of the present invention will be more clearly understood from the following detailed description taken in conjunction with the accompanying drawings, in which.

DETAILED DESCRIPTION OF THE INVENTION

Figure 1:
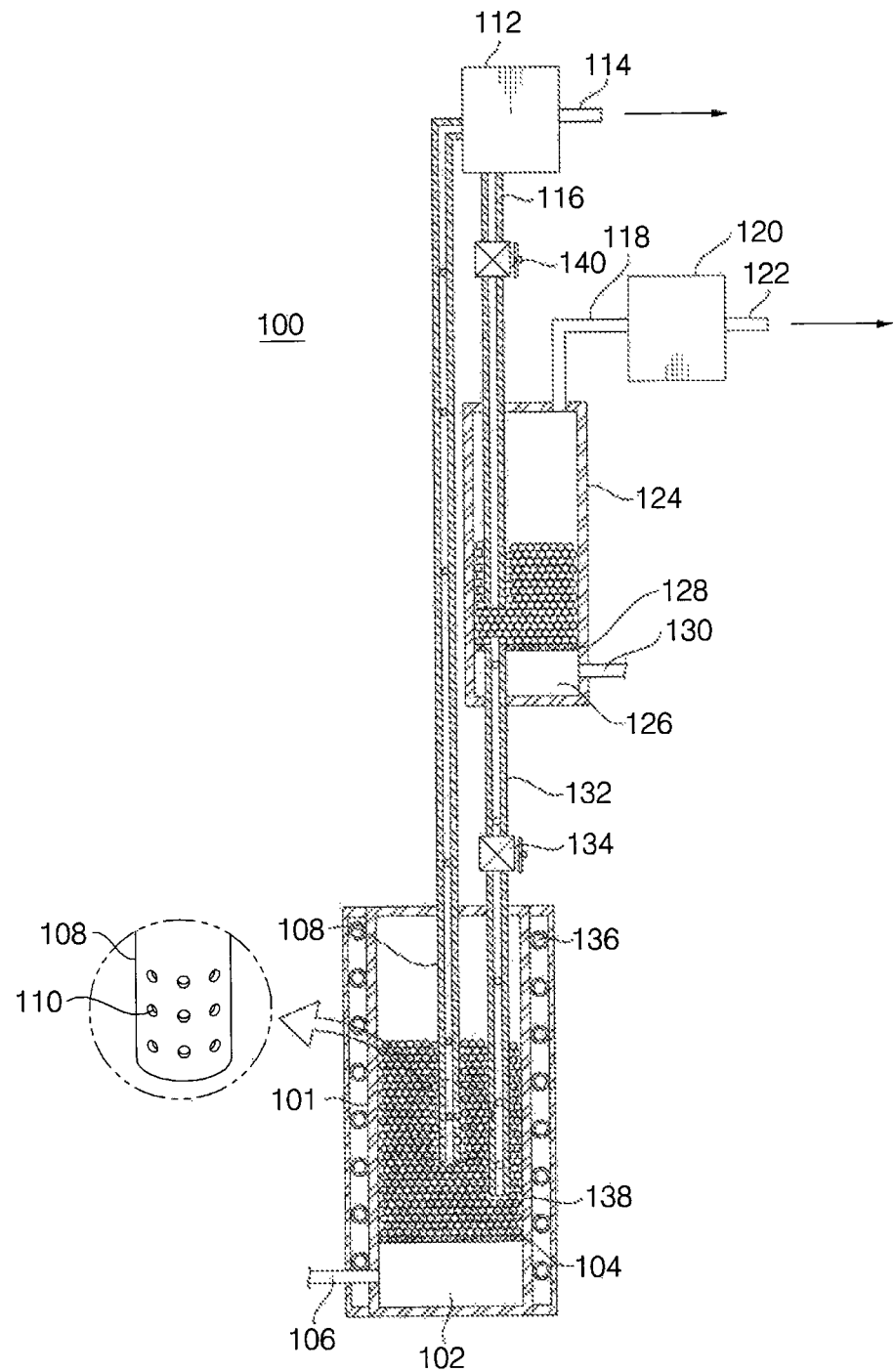
FIG. 1 is a schematic cross-sectional view illustrating a dry $CO_2$ capture apparatus according to one embodiment of the present invention.
Figure 2:
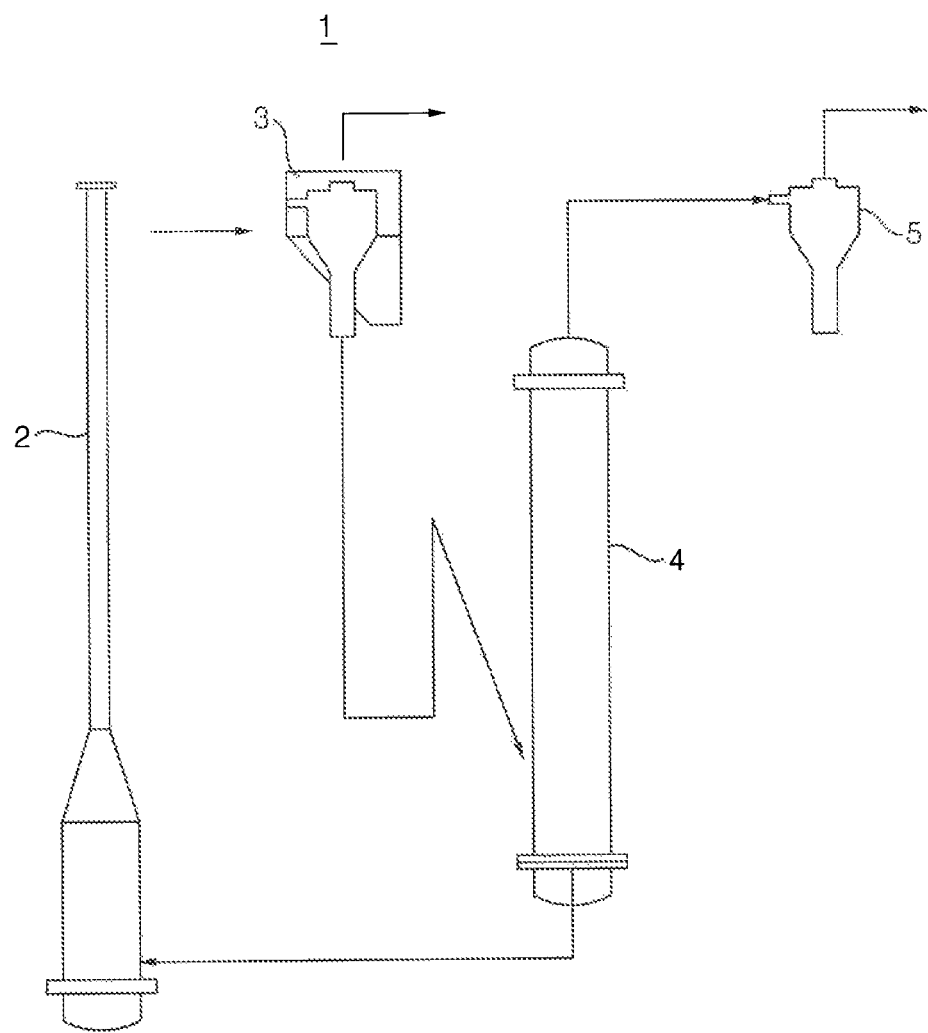
FIG. 2 is a schematic view illustrating a dry $CO_2$ capture apparatus in the related art.

The present invention will now be described more fully hereinafter with reference to the accompanying drawings forming a part of this specification wherein like reference characters designate corresponding parts in the several views. In the embodiments of the present invention, detailed description of the publicly known functions and configurations that are judged to be able to make the purport of the present invention unnecessarily obscure are omitted.

Referring to FIG. 1, reference numeral 100 denotes a dry $CO_2$ capture apparatus. The dry $CO_2$ capture apparatus 100 generally includes a capture reactor 101 and a regenerator 124. A first separator 112 is provided in front of the regenerator 124 while a second separator 120 is located at the rear side of the regenerator 124, in order to separate $CO_2$ and a gas residue free from $CO_2$, respectively.

The capture reactor 101 is a sealed chamber having a space in which reaction is conducted. Bottom side of the capture reactor 101, a capture buffer chamber 102 connected to a gas inflow line 106 is provided. On the other hand, a capture diffusion plate 104 is arranged above the capture buffer chamber 102. A $CO_2$-containing gas such as exhaust gas emitted from a thermoelectric power plant is fed into the chamber through the gas inflow line 106.

The capture diffusion plate 104 has a number of gas holes, through which adsorbent particles 138 cannot pass. The adsorbent particles 138 are dry adsorbents for adsorbing CO known in related art and typically composed of soda ash and ceramic as major ingredients. Since the dry adsorbent is well known in the art, a detailed description of the adsorbent particles 138 will be omitted hereinafter.

A space formed on the top side of the capture diffusion plate 104 is a region in which $CO_2$ is adsorbed to the adsorbent particles 138 and, as shown in FIG. 1, the adsorbent particles 138 fills a part of the space.

Then, the capture reactor 101 is enclosed by a cooling jacket 136. Therefore, heat of reaction generated during $CO_2$ adsorption may be removed by heat exchange with a coolant circulating in the cooling jacket 136. Accordingly, $CO_2$ adsorption ability of the adsorbent particles 138 is retained, thus allowing $CO_2$ adsorption ability of the $CO_2$ capture apparatus 100 to be maintained to a desired level or more.

The capture reactor 101 may have a vertical transport line 108 to transport the adsorbent particles 138 containing $CO_2$ adsorbed thereto in the reactor. The bottom end of the vertical transport line 108 is located inside the capture reactor 101 and, in particular, at a site lower than a maximum height of the adsorbent particles 138 charged in the capture reactor 101.

As enlargely illustrated in the figures, through-holes 110 are formed around an outer circumference of the bottom end portion of the vertical transport line 108, through which the adsorbent particles 130 pass and flow. Therefore, since the vertical transport line 108 includes a plurality of through-holes 110, through which the adsorbent particles 138 may inflow, in addition to an opening positioned at the bottom end of the vertical transport line 108, the adsorbent particles 138 may actively move through the vertical transport line 108.

Meanwhile, the top end of the vertical transport line 108 is connected to a first separator 112. The first separator 112 is a device to separate gas and solids and may include, for example, a cyclone. Since the $CO_2$-adsorbed adsorbent particles 138 is in a solid state, the adsorbent particles settle due to gravity in the first separator 112 and move downward, while a gas residue free from $CO_2$ only may be discharged through a first separation and discharge line 114.

The regenerator 124 is positioned below the first separator 112. The regenerator 124 is arranged at a site lower than the first separator 112 and higher than the capture reactor 101. Accordingly, when the adsorbent particles 138 move through first and second particle transfer lines 116 and 132 described below, the adsorbent particles 138 may easily move from the first separator 112 to the regenerator 124 through the first particle transfer line 116, and then, enter to the capture reactor 101 through the second particle transfer line 132, by gravity applied to the adsorbent particles 138.

The bottom end of the first particle transfer line 116 is located inside the regenerator 124. More particularly, the bottom end of the first particle transfer line 116 is located at a site lower than a maximum height of the adsorbent particles 138 charged in the regenerator 124. Accordingly, since air flow is blocked by the adsorbent particles 138, air backflow toward the first separator 112 through the first particle transfer line 116 can be prevented.

Further, the first particle transfer line 116 may be provided with a first control valve 140 to control an amount of the adsorbent particles 138 settling from the first separator 112.

A regeneration buffer chamber 126 connected with a regenerated heat source input line 130 is provided on the bottom side of the regenerator 124 and a top side of the regenerated buffer chamber 126 is covered with a regenerating diffusion plate 128. The regenerating diffusion plate 128 has a number of gas holes through which the adsorbent particles 138 cannot pass, and may have approximately the same configuration as the capture diffusion plate 104.

A space formed on the top side of the regenerating diffusion plate 128 is a region on which $CO_2$ is discharged toward the adsorbent particles 138 and, as shown in FIG. 1, the adsorbent particles 138 fill a part of the space.

Hot air or steam may be supplied through the regenerated heat source input line 130 to the regeneration buffer chamber 126. Owing to such hot air or steam, $CO_2$ adsorbed inside the adsorbent particles 138 may be discharged to the outside. Here, $CO_2$ generated in the regenerator 124 is transported to the second separator 120 through the gas separation line 118, and then, discharged through the second separation and discharge line 122.

As likewise the first separator 112, the second separator 120 is a device to separate gas and solids from each other and may include, for example, a cyclone. The second separator 120 is connected to the top end of the regenerator 124 through the gas separation line 118. Therefore, the adsorbent particles 138 having a general size do not reach the second separator 124 due to gravity, while powdery adsorbent particles 138 formed by collision of particles during $CO_2$ adsorption can reach the second separator 124.

Accordingly, since finely ground adsorbent particles 138 are in a solid state, they settle due to gravity inside the second separator 120 and move downward. On the other hand, only gaseous $CO_2$ passes through the second separation and discharge line 122, thus being exhausted. An amount of adsorbent particles 138 in a powder form is very little and, in the case where such powdery adsorbent particles are recycled toward the regenerator 124, may cause blockage of some lines such as the vertical transport line 108, the first particle transfer line 116 and/or the second particle transfer line 132. Therefore, it is preferable to separately treat and/or manage the adsorbent powder.

The top end of the second particle transfer line 132 communicates with an upper space of the regenerating diffusion plate 128. Accordingly, the adsorbent particles 138 in the regenerator 124 are not influenced by steam or hot air fed into the regeneration buffer chamber 126, thus moving downward through the second particle transfer line 132.

The bottom end of the second particle transfer line 132 is located lower than a height of the adsorbent particles 138 charged in the capture reactor 101. Accordingly, movement of air in the second particle transfer line 132 and the vertical transport line 108 is blocked by the adsorbent particles 138. Therefore, it is possible to prevent $CO_2$, which was separated by regeneration and possibly fed from the second particle transfer line 132, from moving toward the vertical transport line 108 without reflowing or adsorption of $CO_2$ to the adsorbent particles 138.

The second particle transfer line 132 may be provided with a second control valve 134 to control an amount of the adsorbent particles 138 settling from the regenerator 124.

The dry $CO_2$ capture apparatus 100 according to one embodiment of the present invention may be principally configured as described above. Hereinafter, a detailed description will be given of operational principles of the dry $CO_2$ capture apparatus.

First, exhaust gas containing a large quantity of $CO_2$ flows into a capture reactor 101 through a gas inflow line 106. The inflow gas is diffused in a capture buffer chamber 102, rises through a capture diffusion plate 104 and contacts adsorbent particles 138, while $CO_2$ in the gas is adsorbed in the adsorbent particles 138. Specifically, since an upper part of the capture reactor 101 is empty, the gas completely fills the capture reactor 101 and pushes the adsorbent particles 138 containing $CO_2$ adsorbed thereto upward through a vertical transport line 108 by pressure generated during filling the capture reactor. In addition, heat generated during $CO_2$ adsorption in the adsorbent particles 138 may be absorbed by a coolant.

The adsorbent particles 138 transported from the capture reactor 101 through the vertical transport line 108 reach a first separator 112, and then, settle in the first separator 112 by a load thereof, thus separating $CO_2$-free gas therefrom. Such $CO_2$-free gas is discharged from a first separation and discharge line 114 connected to the first separator 112.

The adsorbent particles 138 containing $CO_2$ adsorbed thereto are fed into a regenerator 124 through a first particle transfer line 116. In this case, movement of the adsorbent particles 138 may be embodied by pressure of gas supplied through the gas inflow line 106 and weight of the adsorbent particles 138, simultaneously.

A temperature of the adsorbent particles 138 is increased by hot air or steam fed through a regenerated heat source input line 130 in the regenerator 124 and allows the adsorbed $CO_2$ to be discharged. The discharged $CO_2$ rises upward through the gas separation line 118, passes through the second separator 120, and is discharged through a second separation and discharge line 122. Fine powder of the adsorbent particles 138 separated in the second separator 120 is captured and further treated.

Hot air or stream fed through the regenerated heat source input line 130 is diffused in a regeneration buffer chamber 126 and contacts the adsorbent particles 138 through a regenerating diffusion plate 128.

The adsorbent particles 138 free from $CO_2$ move downward through a second particle transfer line 132. Movement of the adsorbent particles 138 through the second particle transfer line 132 may be embodied by pressure of the gas supplied from the gas inflow line 106, weight of the adsorbent particles 138 and pressure of the hot wind or steam fed from the regenerated heat source input line 130, simultaneously.

The adsorbent particles 138 re-flowing into the capture reactor 101 may repeat the foregoing behaviors. Specifically, according to the $CO_2$ capture apparatus 100, since the bottom end of the vertical transport line 108, the bottom end of the second particle transfer line 132 and the bottom end of the first particle transfer line 116 are located at a site in which the adsorbent particles 138 are charged, gas backflow or undesired mixing of gas between the capture reactor 101 and the regenerator 124 may be successfully prevented.

Although preferred embodiments of the present invention have been described for illustrative purposes, those skilled in the art will appreciate that various alterations and modification are possible, without departing from the scope and spirit of the present invention as disclosed in the appended claims.

What is claimed is:

1. A dry carbon dioxide ($CO_2$) capture apparatus, comprising: a capture reactor wherein a capture buffer chamber connected with a gas inflow line is provided on the bottom side of the capture reactor, a capture diffusion plate is provided on a top side of the capture buffer chamber, and adsorbent particles are charged in a part of a space which is formed above the capture diffusion plate; a first separator connected to the capture reactor through a vertical transport line, in order to separate the adsorbent particles fed from the capture reactor into a solid part and a gas residue remaining after removing $CO_2$ by the adsorbent particles, then, discharge the gas residue; a regenerator wherein a regeneration buffer chamber connected to a regenerated heat source input line is provided on the bottom side of the regenerator, and a regenerating diffusion plate is provided on the top side of the regeneration buffer chamber, and adsorbent particles are charged in a part of a space which is formed above the regenerating diffusion plate, and wherein the regenerator is connected to the first separator through a first particle transfer line and receives solid adsorbent particles therefrom; a second separator connected to the regenerator through a gas separation line, in order to separate $CO_2$ only from the adsorbent particles in a powder state fed from the regenerator, then, discharge the separated $CO_2$; and a second particle transfer line connected to the regenerator at one end and connected to the capture reactor at the other end, wherein the bottom end of the vertical transport line is located lower than a height of the adsorbent particles charged in the capture reactor.

2. The apparatus according to claim 1, further comprising: a cooling jacket for circulation of a coolant provided around the capture reactor, wherein the coolant absorbs reaction heat generated in the capture reactor.

3. The apparatus according to claim 1, wherein at least one through-hole, through which the adsorbent particles pass, is formed on the bottom end portion of the vertical transport line.

4. The apparatus according to claim 1, wherein the bottom end of the second particle transfer line is located lower than a height of the adsorbent particles charged in the capture reactor, while the top end of the second particle transfer line communicates with an upper space of the regenerating diffusion plate of the regenerator.

5. The apparatus according to claim 1, wherein the second particle transfer line is provided with a control valve to control an amount of the adsorbent particles moving toward the capture reactor.

\* \* \* \* \*